United States Patent
Okazawa et al.

(10) Patent No.: US 6,276,749 B1
(45) Date of Patent: Aug. 21, 2001

(54) POSITION ADJUSTING APPARATUS OF CONTROL CONSOLE FOR WORK VEHICLE

(75) Inventors: Koji Okazawa, Hiratsuka; Satoru Morita, Komatsu, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/531,892

(22) Filed: Mar. 21, 2000

(30) Foreign Application Priority Data

Mar. 24, 1999 (JP) .................................................. 11-080165

(51) Int. Cl.⁷ ....................................................... B60N 2/14
(52) U.S. Cl. ................. 296/190.08; 296/190.01; 296/65.01; 180/329; 180/89.13
(58) Field of Search ......................... 296/190.01, 190.08, 296/64, 65.01, 73; 180/329, 89.12, 89.13

(56) References Cited

U.S. PATENT DOCUMENTS 4,026,379 * 5/1977 Dunn et al. .................... 296/65.07 X
6,039,141 * 3/2000 Denny ................................... 180/329
6,086,142 * 7/2000 Simmons et al. ................ 296/190.01

FOREIGN PATENT DOCUMENTS 10-131235   5/1998   (JP) .

* cited by examiner

Primary Examiner—D. Glenn Dayoan
Assistant Examiner—Jason Morrow
(74) Attorney, Agent, or Firm—Armstrong, Westerman, Hattori, McLeland & Naughton, LLP.

(57) ABSTRACT

A position adjusting apparatus of a control console for a work vehicle in which the control console moves in a state of substantially keeping a relative position with respect to the operator seat prior to a rotation in accordance with the rotation of the operator seat, thereby maintaining a suitable operability, and a maintenance of the vehicle can be performed in an improved manner. Accordingly, a floor frame (20) and a mounting table (26) which mounts a control console (10) are connected to each other via an irregular four section link, and a turn table (12) which is rotatably supported to the floor frame or the operator seat and the mounting table are connected by an interlocking link (15). Accordingly, when an operator seat (11) which is mounted to the turn table rotates, the control console substantially maintains a relative position with respect to the operator seat before the rotation automatically, and can move in a horizontal direction.

3 Claims, 7 Drawing Sheets

POSITION ADJUSTING APPARATUS OF CONTROL CONSOLE FOR WORK VEHICLE

FIELD OF THE INVENTION

The present invention relates to a control console of a work vehicle such as bulldozer and the like, and particularly to a position adjusting apparatus of a control console for a work vehicle which moves the control console so as to interlock with an operator seat capable of rotating in a lateral direction and suitably maintains a relative position between the operator seat and the control console.

BACKGROUND OF THE INVENTION

Conventionally, in the work vehicle, there has been a structure in which work equipments are provided in front of and at the rear of a vehicle body such that a blade apparatus and a ripper apparatus are respectively provided in front of the work vehicle and at the rear of the work vehicle, for example, a bulldozer. In the case of moving forward, working by using the front work equipment or the like, it is advantageous in view of visibility, safety, operability and the like that the operator drives the vehicle in a state of viewing straightly forward with respect to the vehicle. However, in the case of moving backward, working by using the rear work equipment or the like, it is necessary for the operator to view the rearward portion and the rear work equipment. It causes a very large pain and a great fatigue for the operator to view rearward in a state of keeping an attitude that the operator views straightly forward, since it is necessary for the operator to twist the body at a degree more than the necessity.

In order to improve the disadvantage mentioned above, there has been conventionally suggested some techniques.

Figure 12:
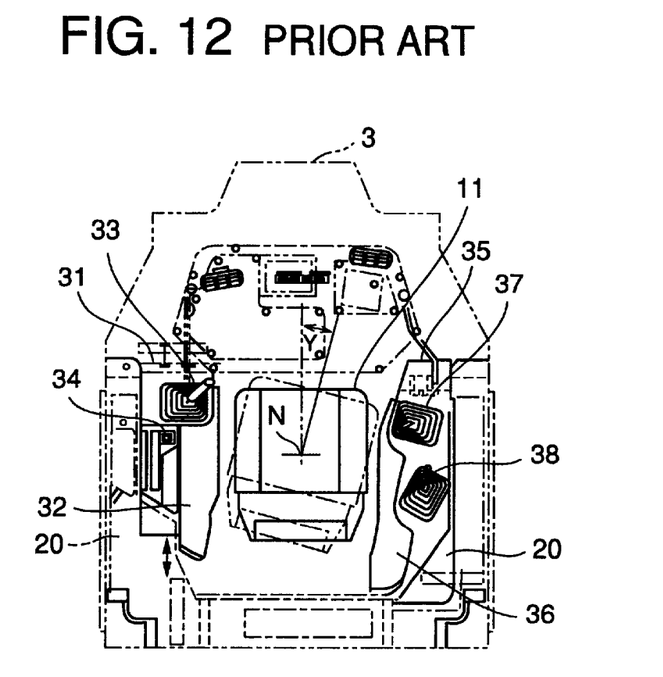
FIG. 12 is an upward elevational view of a driver's seat apparatus in accordance with the present conventional art.

As a prior art of a driver's seat apparatus for a construction machine, for example, there is a structure in which only an operator seat in the bulldozer is made rotatable as shown in FIG. 12. FIG. 12 is an upward elevational view of the driver's seat apparatus.

In FIG. 12, an operator seat 11 provided in a rear portion of a substantially center of a driver's room 3 is structured such as to freely rotate around a center of rotation N in a lateral direction, and a first control console 31 which is mounted to a floor frame 20 is provided in a left side of the operator seat 11. A left arm rest 32 is provided in an inner side on an upper surface of the first control console 31, and operating levers 33 and 34 which respectively operate a steering gear and a transmission are arranged in a front side and a left side of the left arm rest 32.

Further, a second control console 35 which is mounted to the floor frame 20 is provided in a right side of the operator seat 11, a right arm rest 36 is provided in an inner side on an upper surface of the second control console 35, and operating levers 37 and 38 which respectively operate a front work equipment (a blade) and a rear work equipment (a ripper) are arranged in a front side and a right side of the right arm rest 36.

When the vehicle travels forward and works by using the front work equipment (the blade), the structure is made such as to direct the operator seat 11 to a straightly forward direction so as to fix. Then, in the case of the forward travel, the operating levers 33 and 34 are operated so that the vehicle moves forward, and in the case of the blade work, the operating lever 37 is further operated.

Further, when the vehicle travels backward and works by using the rear work equipment (the ripper), the structure is made such as to rotate the operator seat 11 at a predetermined angle γ in a rightward direction so as to direct it to an obliquely right front direction and fix. Then, in the case of the backward travel, the operating levers 33 and 34 are operated so that the vehicle moves backward, and in the case of the ripper work, the operating levers 33 and 34 are operated so that the vehicle moves forward and the operating lever 38 is further operated so as to vertically move the ripper.

Accordingly, since the operator seat 11 is rotated at the predetermined angle γ and is fixed in an obliquely forward direction when the vehicle travels backward and works by using the rear work equipment (the ripper), it is not necessary for the operator to forcibly twist the body and a fatigue of the operator is reduced.

However, the operating levers 33 and 34 which operate the steering gear and the transmission are maintained to be fixed at a position suitable for the vehicle to travel forward.

Figure 13:
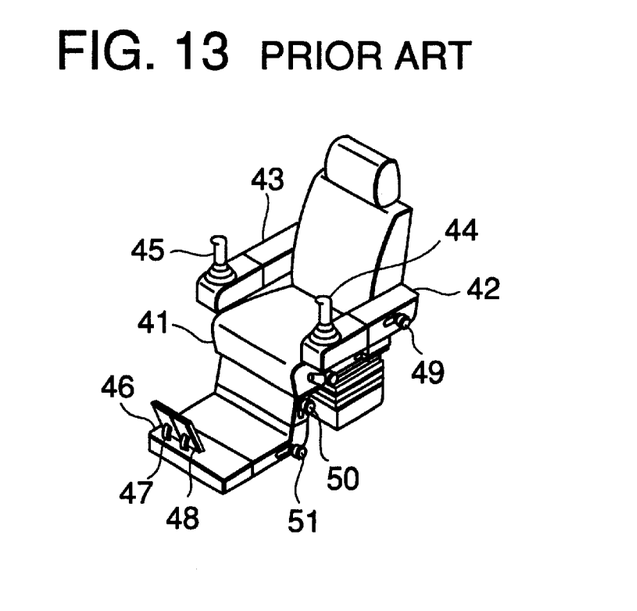
FIG. 13 is a schematic view of another embodiment of a driver's seat apparatus in accordance with the conventional art.

Further, as the other prior art, there is, for example, a technique concerning a driver's seat of a work vehicle which is disclosed in Unexamined Japanese Patent Publication No. 10-131235. In the publication, as shown in FIG. 13, a travel operating lever 44 which controls a speed change and a steering angle and a work equipment operating lever 45 which drives a work equipment are respectively provided on arm rests 42 and 43 which are provided in left and right portions of a seat 41. Further, an accelerator pedal 47 and a brake pedal 48 are provided on a step 46 which is attached to a front end of a seat mounting plate on which the seat 41 is mounted, and the operating levers and the pedals mentioned above are vertically moved together with the seat 41 by means of ascending and descending means (not shown) provided below the seat 41, and can move in a longitudinal direction. Further, each of the operating levers 44 and 45 can be adjusted in the longitudinal direction by operating an operating lever longitudinally adjusting knob 49, and each of the operating pedals 47 and 48 can be adjusted in the vertical direction and the longitudinal direction by operating a pedal vertically adjusting knob 50 and a pedal longitudinally adjusting knob 51, respectively.

However, in the conventional technique concerning the driver's seat of the work vehicle mentioned above, there are the following problems.

In the case of the work vehicle such as the bulldozer, it is necessary to perform the operation of the travelling system (the forward and backward movement, the speed change, the steering angle and the like) for the vehicle substantially at the same time as the time of using the rear work equipment. However, in the technique shown in FIG. 12, in the case of travelling backward and operating the rear work equipment, it is possible to fix the seat at a position of directing the seat to an obliquely forward direction, however, the operating lever for the travelling system is fixed so as to align with the direction of the forward movement, so that it is impossible to set to the oblique position in the same manner as that of the seat. Accordingly, in the case of travelling backward and operating the rear work equipment, the operator can not secure the optimum position of the operating lever for the travelling system, so that there is a problem that an operability is bad.

Further, in the technique disclosed in Unexamined Japanese Patent Publication No. 10-131235 mentioned above, since the structure is made such that the various kinds of operating levers and the various kinds of pedals are integrally provided with the seat so as to be rotated together with the seat, thereby adjusting the position, an outer size of the driver's seat is increased. Accordingly, in the case of maintaining equipment (various kinds of main valves for a steering gear, a work equipment and the like) disposed below the driver's seat, since it is impossible to take out the driver's seat from the driver's room, it is necessary to disassemble the driver's seat within the driver's room, so that there is a problem that a lot of maintenance labor and cost are required. Further, since the driver's seat becomes a special product, there is a problem that it is hard to employ a standard product on market and a cost is increased.

SUMMARY OF THE INVENTION

The present invention is made by taking the conventional problems mentioned above into consideration, and an object of the present invention is to provide a position adjusting apparatus of a control console for a work vehicle in which the control console moves in a state of substantially keeping a relative position with respect to the operator seat prior to a rotation in accordance with the rotation of the operator seat, thereby maintaining a suitable operability, and a maintenance of the vehicle can be performed in an improved manner.

In order to achieve the object mentioned above, in accordance with a first aspect of the invention, there is provided a position adjusting apparatus of a control console for a work vehicle in a driver's seat apparatus of the control console for the work vehicle having an operator seat which is mounted on a turn table rotatably supported in a floor frame so as to rotate in a horizontal direction, an operating lever which is provided in any one of right and left sides of the operator seat apart from the operator seat and is operated for travelling the vehicle and operating the work equipment, and an arm rest, wherein a mounting table which mounts the control console is connected to the floor frame via a four section link so as to rotate in a horizontal direction, and a relative position between the control console and the operator seat can be adjusted so as to move when the operator seat is rotated.

In accordance with the first aspect of the invention, since the structure is made such that the control console disposed in the side portion of the operator seat which can be rotated in a horizontal direction can be rotated in a horizontal direction via the four section link with respect to the floor frame, a freedom of selecting a specified relative position and relative angle of the control console in a horizontal direction with respect to the operator seat is increased when the operator seat rotates, so that an adjustment of the relative position and the relative angle of the control console can be easily performed. Accordingly, when rotating the operator seat in accordance with the contents of the work of the vehicle, it is easy to move the control console to a proper relative position and relative angle with respect to the operator seat, so that it is possible to maintain a proper operability by the control console.

In accordance with a second aspect of the invention, there is provided a position adjusting apparatus of a control console for a work vehicle as cited in the first aspect, wherein the mounting table which mounts the control console and any one of a turn table which mounts the operator seat and the operator seat are connected by an interlocking link a length of which can be adjusted.

In accordance with the second aspect, when rotating the operator seat, it is possible to automatically move the control console to the side portion of the operator seat in a relative manner with interlocking with the rotation of the operator seat via the interlocking link. Accordingly, since it is not necessary to independently move only the control console to the same position as the relative position with the operator seat before being rotated, it is easy to move the control console.

Further, at a time of inspecting the devices (the main valve and the like) disposed below the floor frame on which the operator seat is mounted, only the operator seat can be taken out by removing the interlocking link. Further, since the control console and the like are not integrally formed as is different from the conventional one, the operator seat can be made compact. Accordingly, an improved maintenance can be achieved.

Further, since the interlocking link is structured such that the length thereof can be adjusted, it is possible to easily adjust an assembling error and a relative position between the control console and the operator seat, thereby achieving an improved assembling property.

In accordance with a third aspect of the invention, there is provided a position adjusting apparatus of a control console for a work vehicle as cited in the first aspect or the second aspect, wherein the four section link commonly uses the floor frame as one fixing link and commonly uses the mounting table as a moving link which relatively moves to the fixing link, and a length of the fixing link is made larger than a length of the moving link, thereby forming an irregular four section link.

In accordance with the third aspect, the irregular four section link which moves the control console is simply structured, and further is easy and secure to move the control console to a proper relative position in the side portion of the operator seat in accordance with the movement of the position (that is, the rotation) of the operator seat when rotating the operator seat in a direction opposing to the control consoul. Accordingly, since the proper relative position and relative angle between the operator seat and the control console can be maintained when rotating the operator seat in accordance with the contents of the work of the vehicle, it is possible to always obtain an improved operability.

DETAILED DESCRIPTION OF THE PREFERRED EMBODIMENTS

A description will be given below of an embodiment in accordance with the present invention with reference to FIGS. 1 to 11. In this case, in the drawings, the same reference numerals are attached to the same constructing elements or the same functioning elements as the elements in FIG. 12, and a description thereof will be omitted. Further, in the embodiment, a description will be given by exemplifying a bulldozer (hereinafter, refer to a work vehicle) 1.

Figure 1:
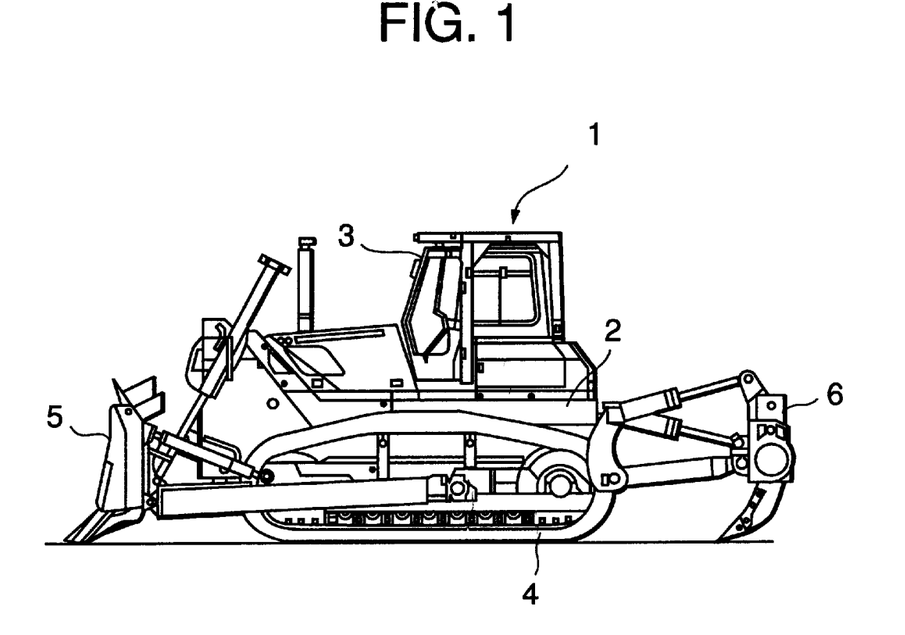
FIG. 1 is a side elevational view of an embodiment of a work vehicle to which a position adjusting apparatus of a control console for the work vehicle in accordance with the present invention is applied.

FIG. 1 is a side elevational view of the work vehicle to which a position adjusting apparatus of a control console for the work vehicle in accordance with the present invention is applied. In the drawing, the work vehicle 1 has a lower travelling body 4 which can freely travel in a lower portion thereof, a vehicle body 2 is arranged above the lower travelling body 4, and a driver's room 3 is mounted near a rear portion in a center of the vehicle body 2. Further, a blade 5 and a ripper 6 corresponding to work equipments are respectively mounted in a front portion and a rear portion of the vehicle body 2 so as to freely move in a vertical direction.

Figure 2:
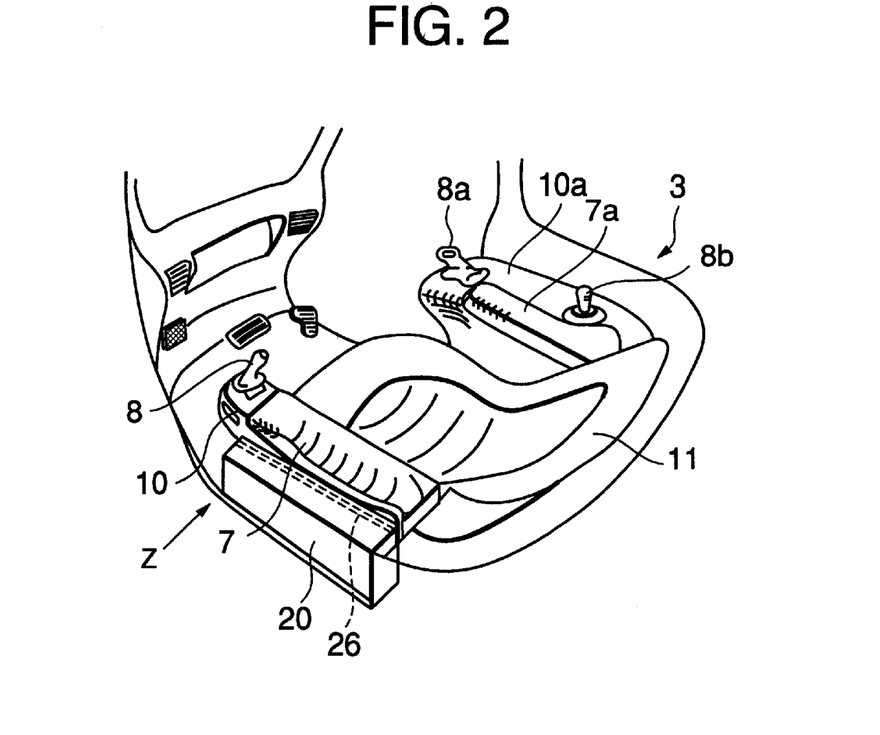
FIG. 2 is a schematic view which explains a driver's room shown in FIG. 1.

FIG. 2 is a schematic view which shows a peripheral portion of the operator seat of the driver's room 3. In the drawing, an operator seat 11 is provided in a rear portion of a substantially center of the driver's room 3 in such a manner as to freely rotate in a lateral direction. A floor frame 20 is provided in a left side of the operator seat 11 in such a manner as to stand up from a floor surface of the driver's room 3, and the control console 10 is mounted to an upper portion of a mounting table 26 which is movably mounted to the floor frame 20 via an irregular four section link as later described in detail with reference to FIGS. 6 to 11. A mono lever 8 which can operate a steering gear and a transmission is provided in a front portion of the control console 10, and an arm rest 7 is provided in a left side portion of an upper surface thereof along a longitudinal direction.

Further, a control console 10a is arranged in a right side of the operator seat 11, an arm rest 7a is provided near an inner side of an upper surface of the control console 10a, and mono levers 8a and 8b which respectively operate a front work equipment (in this case, the blade 5) and a rear work equipment (in this case, the ripper 6) are arranged in a front side and a right side of the arm rest 7a.

Figure 3:
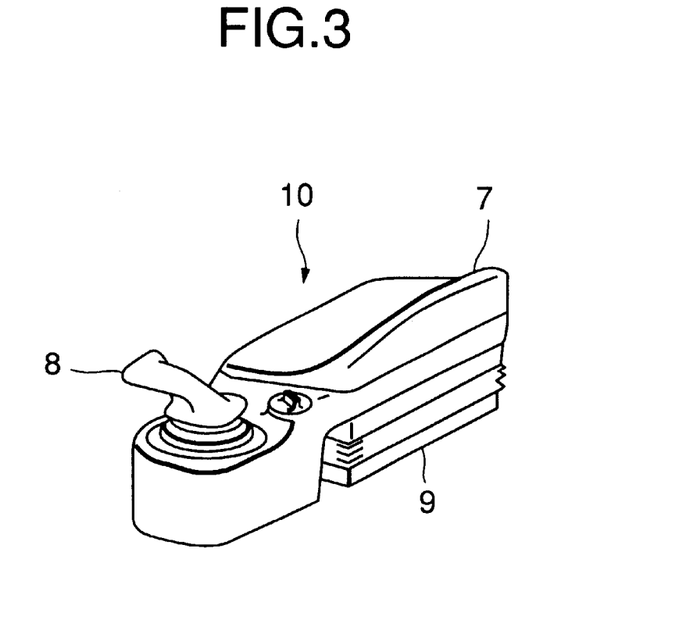
FIG. 3 is a perspective view of the control con sole in FIG. 2.

In this case, in the structure mentioned above, the control console 10 and the control console 10a may be inversely arranged between the right and left sides, and the subject to be operated by each of the mono levers is not limited to the structure mentioned above. FIG. 3 is a perspective view which shows a structure of the control console 10. As shown in the drawing, the arm rest 7 is provided between the center portion and the rear portion on the upper surface of the control console 10, and the mono lever 8 which operates the steering gear and the transmission is arranged in the front portion of the arm rest 7. Further, a vertical position adjusting device 9 which adjusts a position of a height of the control console 10 is provided below the control console 10. The control console 10 is constructed as an integrally assembled product (an assembly product).

Figure 4:
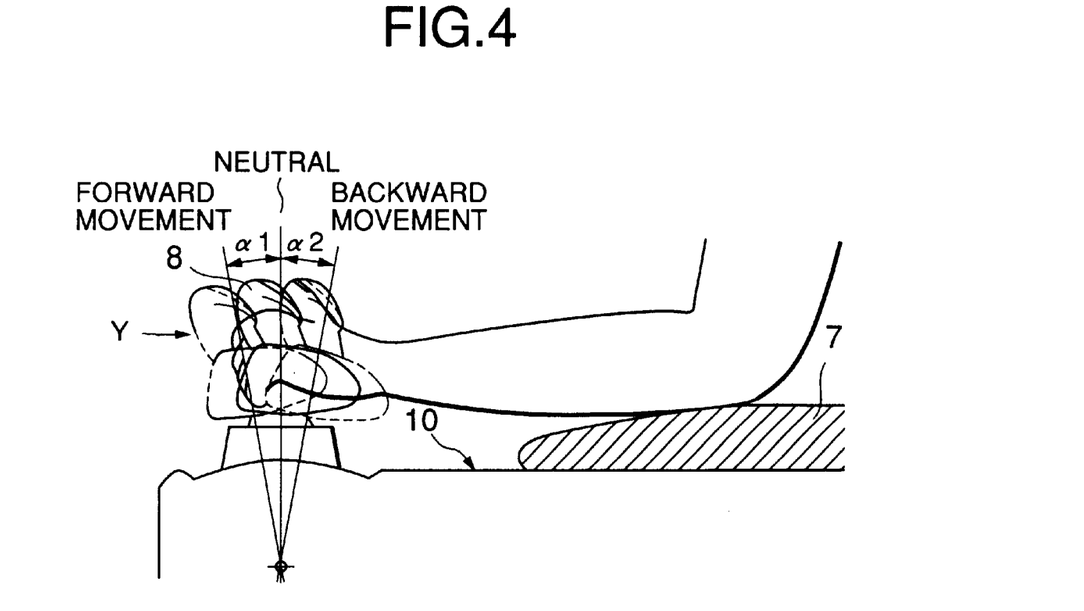
FIG. 4 is a view as seen from an arrow Z in FIG. 2 which explains a longitudinal operation of a mono lever.
Figure 5:
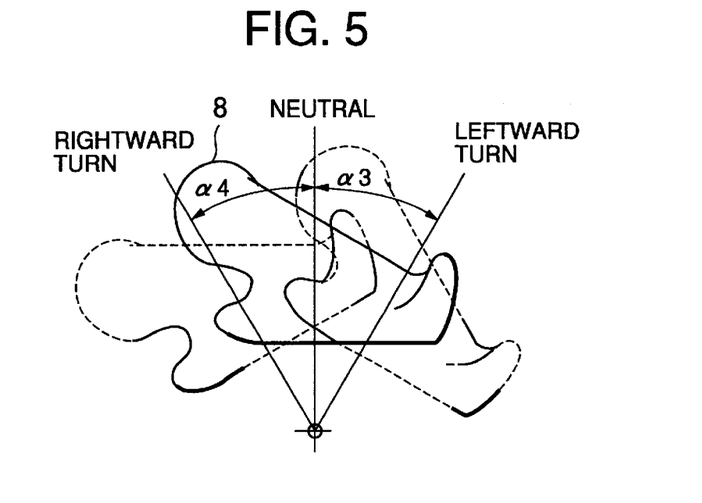
FIG. 5 is a view as seen from an arrow Y in FIG. 4 which explains a lateral operation of the mono lever.

FIGS. 4 and 5 are views which show an operation of the mono lever 8. As shown in FIG. 4, the structure is made such that when tilting the mono lever 8 from a neutral position forward at an angle 1 or rearward at an angle 2 as seen from a left outer side of the vehicle, the vehicle moves forward or backward. Further, FIG. 5 is a view of the mono lever 8 as seen from the front side of the vehicle. The structure is made such that when tilting the mono lever from the neutral position leftward at a predetermined angle (a maximum angle 3) or rightward at a predetermined angle (a maximum angle 4) as seen from the side of the operator, the vehicle turns left or right. Further, an operation push button switch (not shown) is provided above the mono lever 8, and the structure is made such that a stage of a speed of the transmission can be shifted up and down by operating the operation push button switch.

Figure 6:
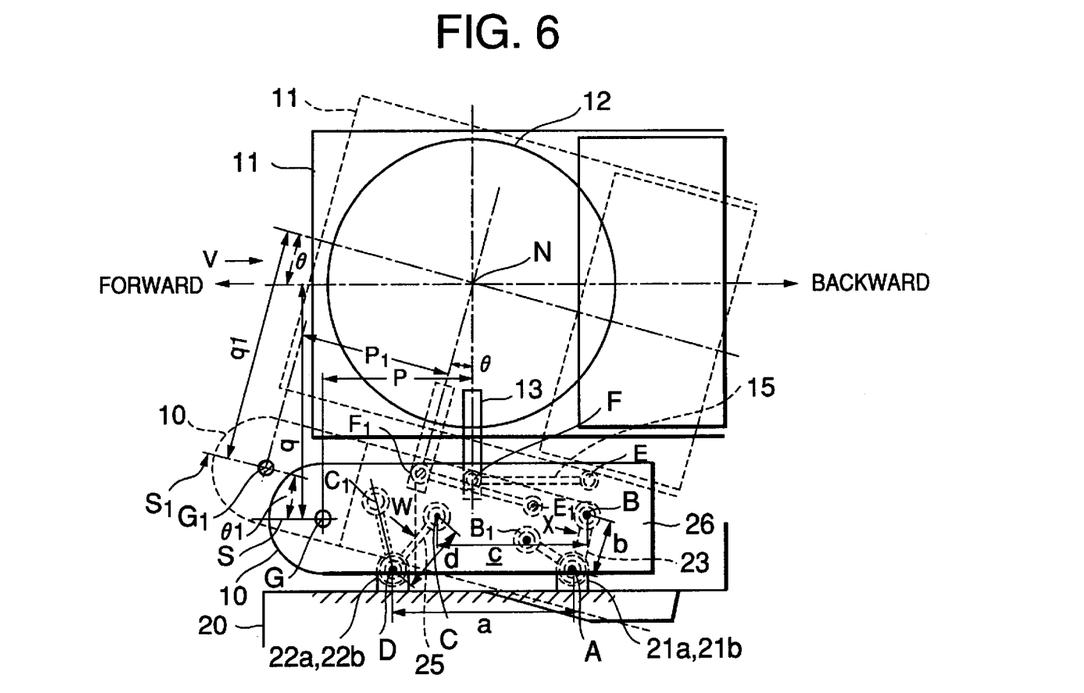
FIG. 6 is an upward elevational view of the position adjusting apparatus of the control console for the work vehicle in accordance with the present invention.
Figure 7:
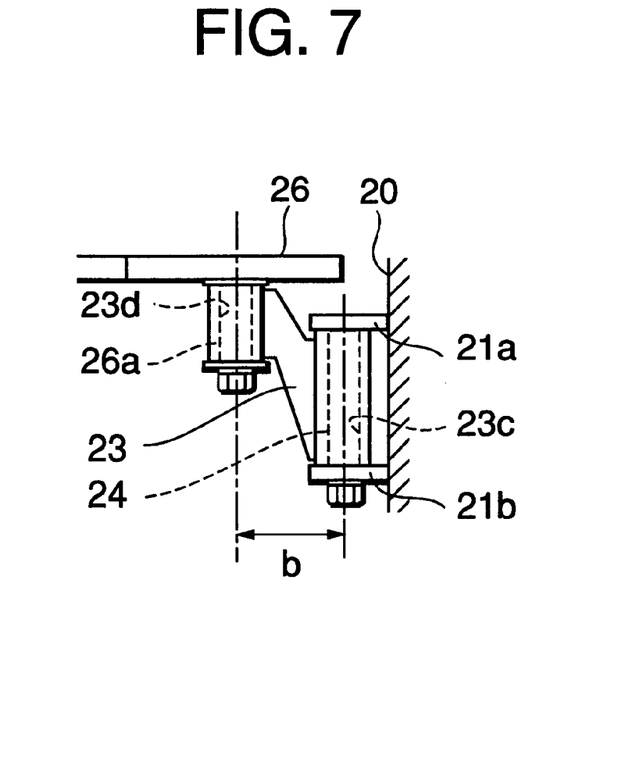
FIG. 7 is a view as seen from an arrow X of a rear link and the like in FIG. 6.

Next, a description will be given of a main portion of the position adjusting apparatus of the control console for the work vehicle in accordance with the present invention with reference to FIGS. 6 to 10. FIG. 6 is an upward elevational view of the position adjusting apparatus of the control console for the work vehicle in accordance with the present invention. FIG. 7 is a view as seen from an arrow X in FIG. 6, and FIG. 8 is a view as seen from an arrow W in FIG. 6.

Since a moving mechanism of the position adjusting apparatus in the control console 10 will be described in detail with reference to FIG. 11, a summary thereof will be described here.

Figure 8:
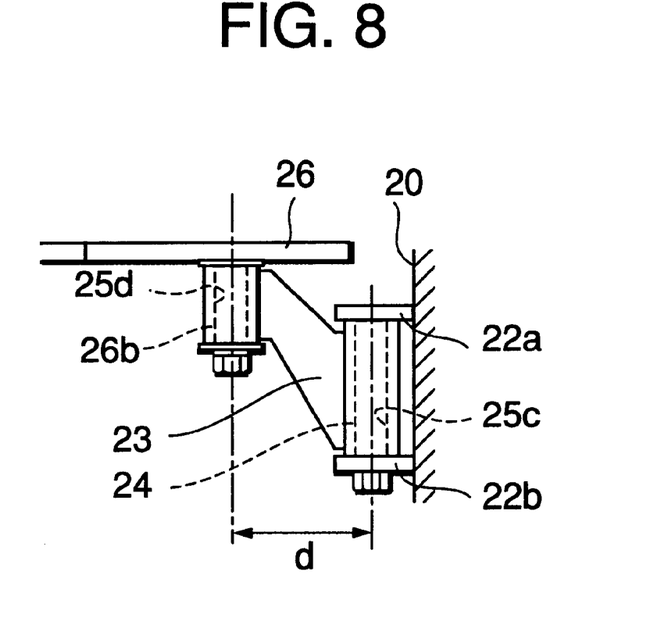
FIG. 8 is a view as seen from an arrow W of a front link and the like in FIG. 6.

As shown in FIGS. 6 to 8, a pair of front brackets 22a and 22b and rear brackets 21a and 21b which are apart from each other in a vertical direction are adhered to side surfaces of the floor frame 20 which is provided in such a manner as to stand up from the floor surface, so as to be apart from each other at a distance a in a longitudinal direction, respectively. Further, holes 25c and 25d are respectively provided in a front link 25 in such a manner as to be apart from each other at a distance d in a vertical direction, and vertical holes 23c and 23d are respectively provided in a rear link 23 in such a manner as to be apart from each other at a distance b.

One end side of the front link 25 is rotatably mounted to the front brackets 22a and 22b via the hole 25c by means of a pin 24, and one end side of the rear link 23 is rotatably mounted to the rear brackets 21a and 21b via the hole 23c by means of the pin 24.

A front shaft 26b and a rear shaft 26a are adhered to a lower surface of the mounting table 26 which mounts the control console 10 in such a manner as to be apart from each other at a distance c (c<a) in a longitudinal direction so as to respectively protrude downward. The front shaft 26b of the mounting table 26 is inserted to a hole 25d in another end side of the front link 25 so as to be rotatably mounted, and the rear shaft 26a of the mounting table 26 is inserted to a hole 23d in another end side of the rear link 23 so as to be rotatably mounted.

Figure 9:
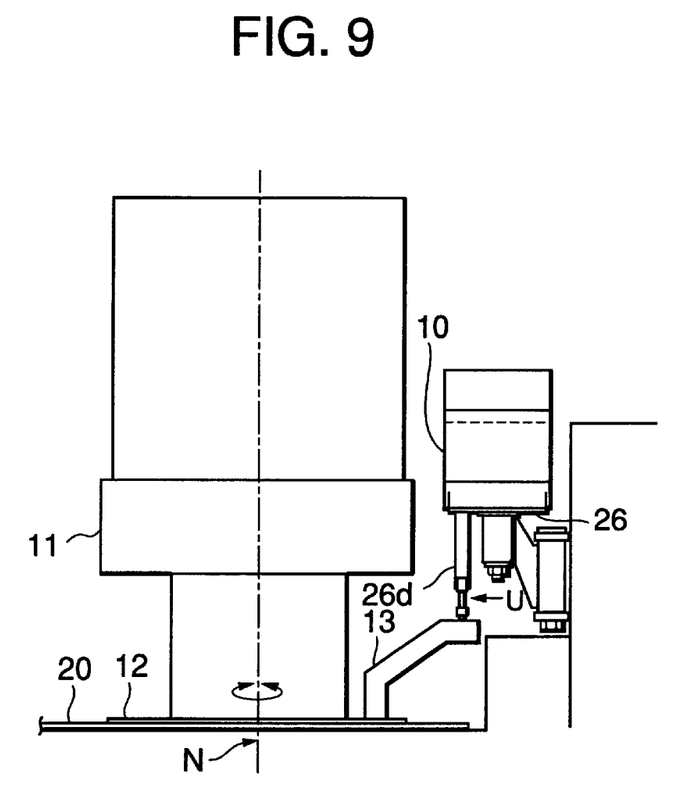
FIG. 9 is a view as seen from an arrow V of t he position adjusting apparatus in FIG. 6.
Figure 10:
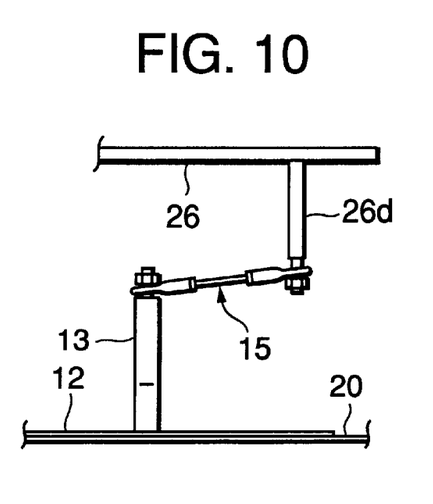
FIG. 10 is a view as seen from an arrow U of an interlocking link and the like in FIG. 9.

Accordingly, by setting the floor frame 20 to a fixing member, the floor frame 20, the rear link 23, the front link 25 and the mounting table 26 form an irregular four section link (A-B-C-D) which can move in a horizontal direction. In this case, each of reference symbols A, B, C and D respectively denotes a center of a pin in the irregular four section link. Further, FIG. 9 is a view as seen from an arrow V in FIG. 6 and FIG. 10 is a view as seen from an arrow U in FIG. 9. As shown in FIGS. 9 and 10, a supporting rod 26d is adhered to the lower surface of the mounting table 26 in such a manner as to protrude downward. Further, the turn table 12 to which the operator seat 11 is mounted is supported to the floor frame 20 so as to freely rotate around a center of rotation N, and an arm member 13 is fixed to an upper surface of the turn table 12. The arm member 13 and the supporting rod 16d of the mounting table 26 are rotatably connected by an interlocking link 15. Accordingly, the mounting table 26 and the turn table 12 are movably connected.

Figure 11:
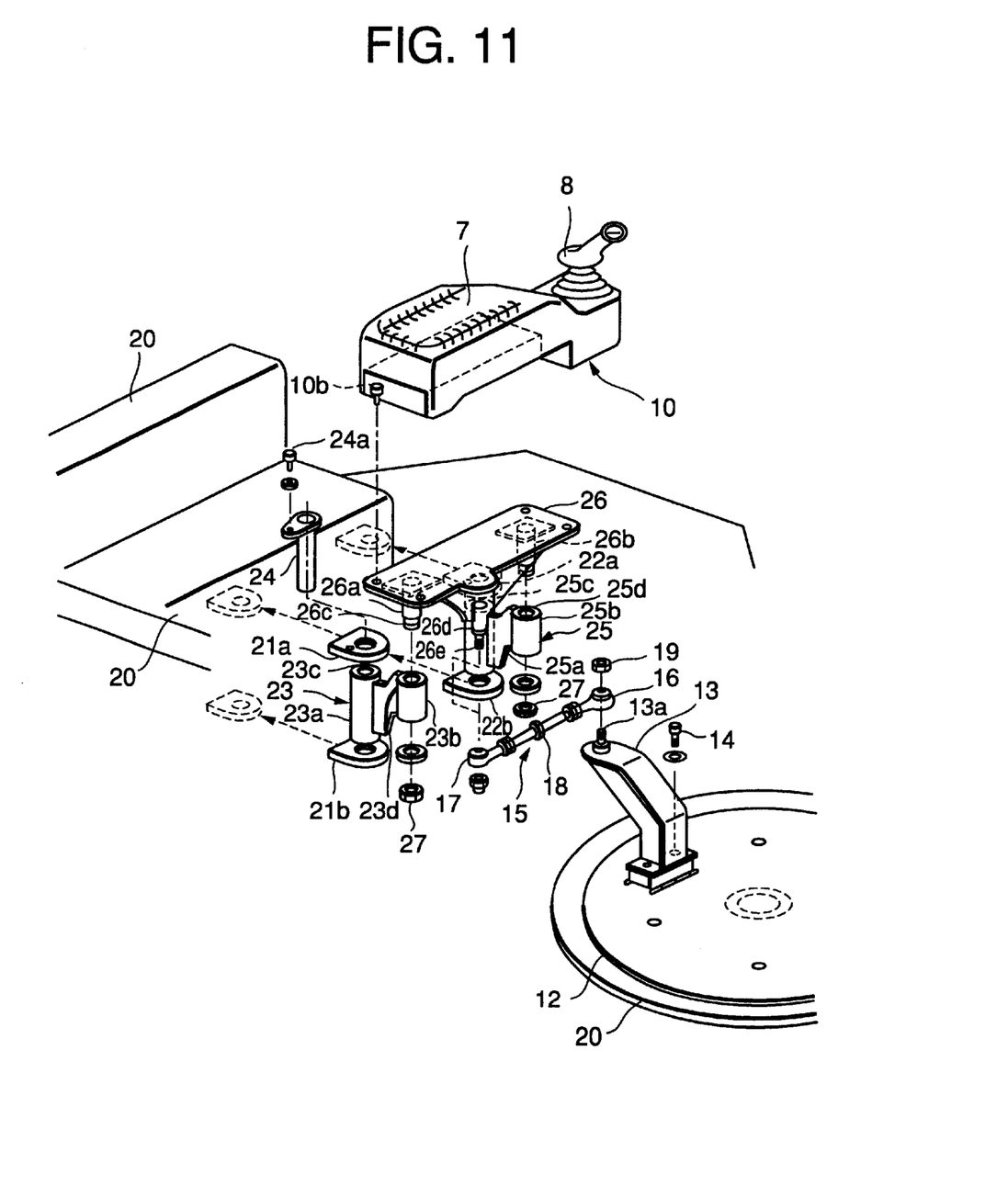
FIG. 11 is a schematic view which explains details of the position adjusting apparatus in FIG. 6.

FIG. 11 is a view which shows details of the position adjusting apparatus of the control console for the work vehicle described above.

A pair of rear brackets 21a and 21b and a pair of front brackets 22a and 22b which are apart from each other in a vertical direction are adhered to the side surfaces of the floor frame 20 which is provided in such a manner as to stand up from the floor surface of the driver's room, so as to be apart from each other in a longitudinal direction.

Further, the rear link 23 has an L boss 23a and an S boss 23b in both end portions thereof, and vertical holes 23c and 23d are respectively provided in the L boss 23a and the S boss 23b. In the same manner, the front link 25 has an L boss 25a and an S boss 25b in both end portions thereof, and vertical holes 25c and 25d are respectively provided in the L boss 25a and the S boss 25b.

The rear link 23 is rotatably supported to the floor frame 20 by inserting the L boss 23a of the rear link 23 between a pair of rear brackets 21a and 21b and inserting the pin 24 to the holes in the rear brackets 21a and 21b and the hole 23c of the L boss 23a. The pin 24 is fixed to the rear bracket 21a by the bolt 24a. In the same manner, the front link 25 is rotatably supported to the floor frame 20 by inserting the L boss 25a of the front link 25 between a pair of front brackets 22a and 22b and inserting the pin 24 to the holes in the front brackets 22a and 22b and the hole 25c of the L boss 25a.

The control console 10 is mounted to the upper surface of the mounting table 26 by the bolt lob. A rear shaft 26a and a front shaft 26b each having a screw portion 26c at a front end thereof are adhered to the lower surface of the mounting table 26 in such a manner as to be apart from each other at a distance c in a longitudinal direction, so as to protrude downward. Further, a supporting rod 26d having a screw portion 26e at a front end thereof is adhered to the lower surface of the mounting table 26 so as to protrude downward.

The rear link 23 becomes rotatable with respect to the rear shaft 26a by inserting the rear shaft 26a of the mounting table 26 to the hole 23d of the S boss 23b in the rear link 23 and fastening a nut 27 to the screw portion 26c of the rear shaft 26a. In the same manner, the front link 25 becomes rotatable with respect to the front shaft 26b by inserting the front shaft 26b of the mounting table 26 to the hole 25d of the S boss 25b in the front link 25 and fastening the nut 27 to the screw portion 26c.

Accordingly, by setting the floor frame 20 to a fixing member, the floor frame 20, the rear link 23, the front link 25 and the mounting table 26 form the irregular four section link which can move in a horizontal direction. On the contrary, the turn table 12 to which the operator seat 11 is mounted is rotatably supported to the floor frame 20. The lower end portion of the arm member 13 having the screw portion 13a at the upper end portion is fixed to the upper surface of the turn table 12 by the bolt 14.

Further, the interlocking link 15 has a ball type universal join (hereinafter, refer to a universal portion) having a leftward screw, a universal portion 17 having a rightward screw, and a rod which connects between the screws in both of the universal portions 16 and 17 in a manner of a turn buckle, whereby a length between both of the universal portions 16 and 17 can be adjusted.

The universal portion 16 in one end side of the interlocking link 15 is fixed to the screw portion 13a of the arm member 13 by a nut 19, and the universal portion 17 in another side thereof is fixed to the screw portion 26e of the supporting rod 26d in the mounting table 26 by the nut 19. Accordingly, the mounting table 26 and the turn table are movably connected to each other.

Next, a description will be given of an operation of the present position adjusting apparatus with reference to FIG. 6.

When rotating the operator seat 11 on the turn table 12 toward the opposite side to the control console 10 at a predetermined angle $\theta$ in accordance with the contents of the work of the vehicle, a point of connection F between the arm member 13 of the turn table 12 and the interlocking link 15 moves to a point F1. Accordingly, the supporting rod 26d of the mounting table 26 moves from a point E to a point E1 by being pulled by means of the interlocking link 15. In accordance with the movement of the supporting rod 26d toward the point E1, the irregular four section link A-B-C-D formed by the floor frame 20, the rear link 23, the front link 25 and the mounting table 26 horizontally moves so as to form the irregular four section link A-B1-C1-D, and a point of center B of the rear shaft 26a and a point of center C of the front shaft 26b in the mounting table 26 respectively move to a point B1 and a point C1. As a result, the control console 10 mounted on the mounting table 26 moves to a position shown by a two-dot chain line in the drawing, whereby the relative position with respect to the operator seat 11 is automatically adjusted.

Here, a center G of operation of the mono lever 8 provided in the control console 10 moves to a point G1 and the relative position with respect to the operator seat 11 is shifted from a position (p, q) to a position (p1, q1), however, in this case, a link length of each of the irregular four section links and a length of the interlocking link 15 are set so as to satisfy a relation $p1 \approx p$ and $q1 \approx q$. Further, at the same time, a center line of a lateral width of the control console 10 moves from a line s to a line s1 and a line s and a line s1 form an angle $\theta 1$, however, a link length of each of the irregular four section links and a length of the interlocking link 15 are set so as to satisfy a relation $\theta 1 \approx \theta$. Accordingly, the relative position between the control console 10 and the operator seat 11 are substantially equal to each other between the times before and after the operator seat 11 rotates, and the angle of rotation of the control console 10 becomes substantially equal to the angle of rotation of the operator seat 11, whereby the relative position and the angle of rotation are maintained. As a result, a proper operability of the control console 10 can be easily maintained.

As described above, in accordance with the position adjusting apparatus of the control console for the vehicle of the present invention, when rotating the operator seat on the turn table toward the opposite side to the control console at a predetermined angle in accordance with the contents of the work of the vehicle, the control console can move via the mounting table due to the operation of the interlocking link and the irregular four section link in correspondence to the movement of the operator seat with maintaining the relative position and the relative angle with respect to the operator seat.

Accordingly, since the relative position between the center of operation of the mono lever which operates the steering gear and the transmission, and the operator seat is substantially maintained automatically in such a manner as to interlock with the rotation of the operator seat when rotating the operator seat, it is not necessary to independently move only the control console to the proper relative position with respect to the operator seat, whereby it is possible to always maintain the proper operability in an easy manner. Accordingly, it is possible to reduce a fatigue of the operator and improve the operability.

Further, since the operator seat itself is not the special product described in the prior art and structured such that the arm rest or the like is integrally provided, and can be constructed by the standard products on the market, it is possible to reduce the cost thereof. Further, at a time of inspecting the devices (the main valve devices and the like) provided below the floor frame on which the operator seat is mounted, it is possible to take out only the operator seat by removing the interlocking link, and further, since the operator seat is made compact, the operator seat can be easily taken out from the driver's room. Accordingly, it is possible to maintain a n improved maintenance.

Further, since the interlocking link for connecting between the turn table to which the operator seat is mounted or the operator seat and the mounting table to which the control console is mounted is structured such that the length thereof can be easily adjusted, it is possible to adjust an error for assembling the turn table and the mounting table and the relative position therebetween, so that an improved assembling property can be achieved.

In this case, in the embodiment mentioned above, a description will be given of the embodiment in which various kinds of mono levers for various kinds of operations are arranged in the control console, however, the present invention is not limited to this, and for example, a plurality of operating levers may be arranged, in this case, the same operations and effects as those mentioned above can be obtained.

What is claimed is:

1. A position adjusting apparatus of a control console for a work vehicle in a driver's seat apparatus of the control console for the work vehicle having an operator seat which is supported in a floor frame so as to rotate in a horizontal direction, an operating lever which is provided at least in any one of right and left sides of the operator seat apart from the operator seat and is operated for travelling the vehicle and operating the work equipment, and an arm rest, wherein a mounting table which mounts said control console is connected to said floor frame via a four section link so as to rotate in a horizontal direction, and a relative position between the control console and the operator seat can be adjusted so as to move when said operator seat is rotated.

2. A position adjusting apparatus of a control console for a work vehicle as claimed in claim 1, wherein said mounting table which mounts the control console and any one of a turn table which mounts the operator seat and said operator seat are connected by an interlocking link a length of which can be adjusted.

3. A position adjusting apparatus of a control console for a work vehicle as claimed in claim 1 or 2, wherein said four section link commonly uses said floor frame as one fixing link and commonly uses said mounting table as a moving link which relatively moves to the fixing link, and a length of the fixing link is made larger than a length of the moving link, thereby forming an irregular four section link.

* * * * *